Patented June 7, 1949

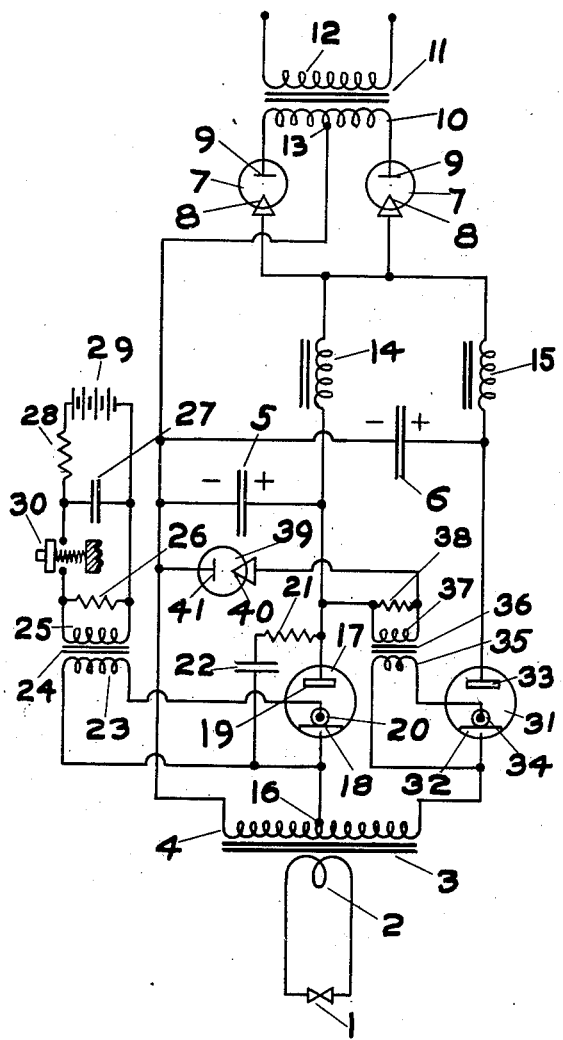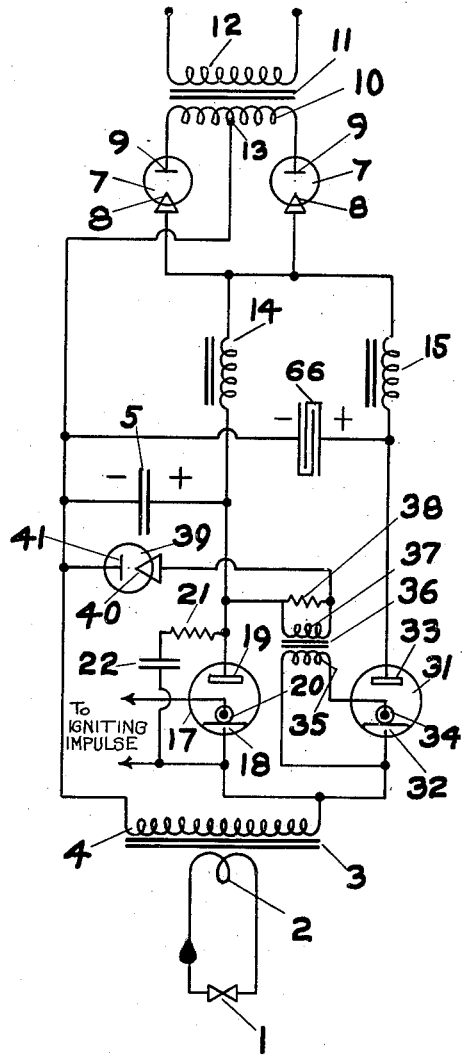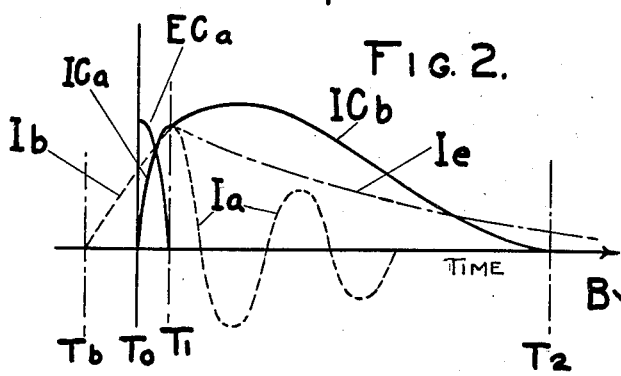

2,472,110

UNITED STATES PATENT OFFICE 2,472,110

CONDENSER WELDING SYSTEM

Hans Klemperer, Belmont, Mass., assignor to Raytheon Manufacturing Company, Newton, Mass., a corporation of Delaware Application February 1, 1940, Serial No. 316,798

18 Claims. (Cl. 219—4)

This invention relates to condenser welding systems, and more particularly to those systems in which electrical energy is stored in a condenser, and then discharged through a welding transformer to deliver welding current to a resistance welding load.

In welding many types of metals, especially aluminum and aluminum alloys, it is desirable to supply a sharply rising pulse of current to the welding load, then to cause the current to persist at a relatively high value for a sufficient length of time to cause the weld to be made, and then to die off in a reasonably short period of time so that the welding electrodes may be opened without danger of pitting the work surfaces.

An object of this invention is to devise a condenser welding system of the foregoing type in which the current delivered to the load has the desired characteristics as outlined above.

Another object is to devise such an arrangement in which the proper amount of energy is delivered to the welding load without excessive peaks of current being supplied during the initial portion of the welding period.

Another object is to increase the efficiency of the utilization of power in such a welding system, and thus enable smaller apparatus to be used for a desired amount of power.

A further object is to accomplish the sequence of operations necessary to produce the foregoing results automatically by use of controlled discharge tubes.

A still further object is to devise an arrangement of the foregoing nature which is simple, reliable and inexpensive.

The foregoing and other objects of this invention will be best understood from the following exemplifications of my invention, reference being had to the accompanying drawing, wherein:

Fig. 1 is a diagram of a condenser welding system embodying my invention;

Fig. 2 is a set of curves illustrating the mode of operation of my invention; and Fig. 3 is a diagram illustrating another modification of my invention.

In the arrangement shown in Fig. 1, welding current is to be supplied to a resistance welding load 1 from the secondary winding 2 of a welding transformer 3 provided with a primary winding 4. The energy necessary to accomplish welding is adapted to be supplied to the primary winding 4 from a pair of condensers 5 and 6. These condensers are adapted to be charged from any suitable source of direct current, such as a direct current generator, battery, rectifier or the like.

In Fig. 1 the direct current is shown as being supplied from a pair of rectifier tubes 7. These tubes may be of the gas or vapor-filled type having permanently-energized cathodes 8. These cathodes may be thermionic filaments or any other suitable type of cathode. The rectifier tubes 7 are provided with anodes 9 which are connected to opposite sides of the secondary winding 10 of a charging transformer 11. This charging transformer is provided with a primary winding 12 which is adapted to be connected to some suitable source of alternating current. The secondary winding 10 is provided with a center tap 13 which is connected to the negative side of each condenser 5 and 6. The cathodes 8 are connected together to provide the positive side of the rectified direct current. These cathodes are in turn connected through impedances 14 and 15 to the positive sides of the condensers 5 and 6, respectively. The impedances 14 and 15 are preferably inductances, and are of a value to maintain a reasonable charging rate for the condensers 5 and 6. Thus when the primary winding 12 is energized, charging current is supplied to the condensers 5 and 6, which thereupon are charged to a predetermined voltage.

The primary winding 4 of the welding transformer is provided with a tap 16 intermediate the ends thereof. The condenser 5 is adapted to be discharged through the portion of the primary winding 4 between the tap 16 and the left end of said primary winding. For this purpose the negative side of the condenser 5 may be connected directly to the left end of the primary winding 6 while the positive side of the condenser 5 is connected to the tap 16 through a controlled ignition discharge tube 17. The tube 17 is preferably of the pool cathode type with an igniter for initiating a cathode spot on the pool in order to cause the pool to conduct current. Although any suitable type of igniter may be used, it preferably is the type described and claimed in the copending application of Percy L. Spencer, Serial No. 303,963, filed November 13, 1939, for an improvement in Arc igniting devices, now Patent No. 2,290,897, dated July 28, 1942, consisting of a conductor separated and insulated from the cathode by a thin glass layer. The tube 17 is provided with a pool cathode 18, preferably of mercury, connected to the tap 16. The tube 17 is also provided with an anode connected directly to the positive side of the condenser 5. An igniter 20, preferably of the type as explained above, is provided for the cathode 18. In order to assist the tube 17 in reliable starting, a resistance 21 in series with a condenser 22 is preferably connected between the anode 19 and the cathode 18. In order to supply the igniter 20 with an igniting impulse for initiating the discharge of the condenser 5, a secondary winding 23 of an igniting transformer 24 is connected between the igniter 20 and its associated cathode 18. The igniting transformer 24 is provided with a primary winding 25, preferably with a resistance 26 connected across it. The primary winding 25 is adapted to be supplied with a pulse of current for igniting purposes from a condenser 27 which may suitably be charged from a source of direct current, such as battery 29 in series with a current-limiting resistance 28. A pushbutton switch 30 is provided to connect the condenser 27 to the primary winding 25.

Following the discharge of the condenser 5, the condenser 6 is also adapted to be discharged through the primary winding 4 of the welding transformer 3. However, this discharge is adapted to take place through the entire primary winding 4. For this purpose a controlled ignition discharge tube 31, preferably of the same type as tube 17, is connected between the condenser 6 and the winding 4. The tube 31 is provided with a pool cathode 32 connected to the right end of the primary winding 4, and with an anode 33 connected to the positive side of the condenser 6. An igniter 34, preferably of the same type as that described in connection with an igniter 20, is provided for the pool cathode 32. An igniting impulse is supplied to said igniter 34 at the proper time from the secondary winding 35 of an ignition transformer 36. Said secondary winding 35 is connected between the igniter 34 and its associated cathode 32. The ignition transformer 36 is provided with a primary winding 37 adapted to be supplied with igniting impulses from the voltage which appears across a resistance 38. The resistance 38 is connected in series with a rectifying tube 39 directly across the condenser 5. The rectifying tube 39 may be of small current-carrying capacity, but preferably is one which can withstand the negative voltage applied to the condenser 5. The rectifying tube 39 is provided with a permanently-energized cathode 40 and an anode 41. The anode 41 is connected to the negative side of the condenser 5 so that when said condenser is initially charged from the rectifier tubes 7, the voltage on the tube 39 is impressed upon it in the non-conducting direction, and therefore said tube does not conduct current.

The operation of the system described in Fig. 1 may be understood more clearly by referring to the curves shown in Fig. 2. The curves of Fig. 2 do not purport to show the operation of this system quantitatively, although they do represent in a general qualitative manner the nature of said operation. The curve $ICa$—$Ia$ represents the current which would be supplied to the welding load 1 if the condenser 5 were connected directly to the primary winding 4 between the intermediate tap 16 and the left end thereof so as to discharge freely through said primary winding. It will be seen that this discharge current would be oscillatory. The curve $Ib$—$ICb$ represents the current which would flow if the condenser 6 were connected across the entire primary winding 4 so as to discharge freely through it. It will be noted that in this instance the additional turns on the primary winding between the intermediate tap 16 and the right end thereof are sufficient to make the discharge of the condenser 6 non-oscillatory. The curve $ECa$ represents the voltage across the condenser 5 during a portion of the welding operation.

At the time $T_0$, the pushbutton switch 30 is closed, permitting the previously charged condenser 27 to discharge through the primary winding 25, and thus supply an igniting impulse to the igniter 20. This establishes an arc through the tube 17 and permits the condenser 5 to discharge through the left portion of the primary winding 4 of the welding transformer 3. During this discharge the voltage on the condenser 5 $ECa$ decreases from its predetermined maximum value to zero during which time the current rises rapidly to a predetermined value. Thus at the time $T_1$, the voltage across the condenser 5 has fallen to zero and is tending to reverse while a substantial predetermined amount of current is flowing in the primary winding 4 and thus in the resistance welding load 1. Upon the voltage across the condenser 5 tending to reverse, the polarity on the tube 39 is reversed, permitting said tube to conduct a short pulse of current. This delivers an igniting impulse through the ignition transformer 36 to the igniter 34 which establishes an arc in the tube 31 and renders said tube conductive. Thereupon the condenser 6 discharges through the tube 31, and the entire primary winding 4. At the time when the tube 31 becomes conductive, the voltage of the condenser 6 effectively extinguishes any remaining conduction of the tube 17, so that thereafter the condenser 5 is disconnected from the discharge circuit and can immediately start recharging from the direct current supplied by the rectifier tubes 8 through the impedance 14. When the tube 31 starts to conduct current, the characteristics of the discharge circuit of the condenser 6 come into play, and the current thereafter flowing through the primary winding 4 and thus in the welding load 1 continues along the curve $ICb$. This current, as will be seen from Fig. 2, rises much more slowly than the initial pulse of current $ICa$, and thereafter decreases to zero at the time $T_2$.

It will be noted that if a circuit consisting only of the condenser 5 and its associated discharge circuit were used, the current supplied to the welding load would be oscillatory, and would be insufficient for the purposes for which this invention is designed. If, however, a circuit employing only the condenser 6 and its associated discharge circuit were used, the discharge of said condenser would start earlier at a time $Tb$. However, under these conditions the current would rise rather slowly along the curve $Ib$. As previously indicated for satisfactory welding of the type accomplished by the present invention, it is desirable that the current supplied to the welding load rise much more rapidly than that obtainable by a current of the type exemplified by the curve $Ib$. A third system of welding is that represented by the system described and claimed in the copending application of John W. Dawson for an improvement in Condenser welding systems, Serial No. 309,124, filed December 14, 1939. In this latter type of system, the current is permitted to rise along the curve $ICa$, and then die off exponentially along the dot-dash curve $Ie$. However, as previously indicated, it is often desirable to maintain, immediately after the first sharp rise of current, a current which stays at a relatively high value in order to furnish additional heating and energy to the welding load. As will be seen from Fig. 2, the arrangement in accordance with the present invention accomplishes this effect without at the same time introducing any large peaks or surges of current such as might be secured if the increased energy supplied to the welding load were attempted to be secured merely by increasing the size of the condenser 5. Furthermore, it will be noted that the current ICb falls to zero in a considerably shorter time than the decay current Ie. Due to the various novel aspects of my invention, I have been enabled to successfully weld large thicknesses of aluminum and aluminum alloy metals with the use of relatively small condensers and reasonable voltages applied thereto.

Instead of changing the constants of the discharge circuit of the second condenser by changing the number of turns in the primary winding 4 connected in the discharge circuit thereof, the discharge can be made non-oscillatory by increasing the size of the second condenser. An example of such an arrangement is shown in Fig. 3, in which the same reference numerals are applied where the elements are identical with those shown in Fig. 1. However, instead of the condensers 6 of Fig. 1, a larger condenser 66 is utilized. Also instead of providing additional turns on the primary winding 4 for the discharge of the condenser 66, said condenser is discharged through the same part of the primary winding as the condenser 5. However, the value of the condenser 66 is made sufficiently large so that its discharge is non-oscillatory. The analysis of the operation of the system shown in Fig. 3 is identical with that given above in connection with Fig. 1, and therefore the curves of Fig. 2 illustrate the operation of Fig. 3 as well.

Of course it is to be understood that this invention is not limited to the particular details as described above inasmuch as many equivalents will suggest themselves to those skilled in the art. For example, other types of discharge tubes or circuit-connecting means may be utilized instead of the tubes shown. Also other arrangements for causing the discharge of one condenser to be oscillatory and the other non-oscillatory might be adopted. As a matter of fact, in certain aspects of my invention both discharges may be made either oscillatory or non-oscillatory inasmuch as the feature of discharging the condensers in sequence in the particular manner and in the particular relationship described is in itself an aspect of my invention which may be utilized in many instances. Various other ideas as to the utilization of the principles enunciated and claimed herein will suggest themselves to those skilled in the art. It is accordingly desired that the appended claims be given a broad interpretation commensurate with the scope of the invention within the art.

What is claimed is:

1. A welding system comprising a plurality of condensers, means for charging said condensers, a welding load circuit, means for discharging one of said condensers into said load circuit, and means which becomes active upon substantial discharge of said condenser to discharge another of said condensers into said load circuit.

2. A welding system comprising a plurality of condensers, means for charging said condensers, a welding load circuit, means for discharging one of said condensers into said load circuit, and means which becomes active upon substantially complete discharge of said condenser to discharge another of said condensers into said load circuit.

3. A welding system comprising a plurality of condensers, means for charging said condensers, a welding load circuit, means for discharging one of said condensers into said load circuit, the constants of said condenser as related to its discharge circuit so established being such as to tend to make said discharge oscillatory, and means which becomes active upon substantial discharge of said condenser to discharge another of said condensers into said load circuit.

4. A welding system comprising a plurality of condensers, means for charging said condensers, a welding load circuit, means for discharging one of said condensers into said load circuit, the constants of said condenser as related to its discharge circuit so established being such as to tend to make said discharge oscillatory, and means which becomes active upon substantially complete discharge of said condenser to discharge another of said condensers into said load circuit.

5. A welding system comprising a plurality of condensers, means for charging said condensers, a welding load circuit, means for discharging one of said condensers into said load circuit, the constants of said condenser as related to its discharge circuit so established being such as to tend to make said discharge oscillatory, and means which becomes active upon substantial discharge of said condenser to discharge another of said condensers into said load circuit, the constants of said last-named condenser as related to its discharge circuit so established being such as to make the discharge of said last-named condenser non-oscillatory.

6. A welding system comprising a plurality of condensers, means for charging said condensers, a welding load circuit, means for discharging one of said condensers into said load circuit, the constants of said condenser as related to its discharge circuit so established being such as to tend to make said discharge oscillatory, and means which becomes active upon substantially complete discharge of said condenser to discharge another of said condensers into said load circuit, the constants of said last-named condenser as related to its discharge circuit so established being such as to make the discharge of said last-named condenser non-oscillatory.

7. A welding system comprising a plurality of condensers, means for charging said condensers, a welding load circuit, and means for discharging said condensers in overlapping sequence into said welding load to accomplish a single welding operation.

8. A welding system comprising a plurality of condensers, means for charging said condensers, a welding load circuit, means for discharging one of said condensers into said load circuit, the constants of said condenser as related to its discharge circuit so established being such as to tend to make said discharge oscillatory, and means responsive to reversal of voltage on said condenser during said discharge to discharge another of said condensers into said load circuit.

9. A welding system comprising a plurality of condensers, means for charging said condensers, a welding load circuit, means for discharging one of said condensers into said load circuit, the constants of said condenser as related to its discharge circuit so established being such as to tend to make said discharge oscillatory, and means responsive to reversal of voltage on said condenser during said discharge to discharge another of said condensers into said load circuit, the constants of said last-named condenser as related to its discharge circuit so established being such as to make the discharge of said last-named condenser non-oscillatory.

10. A welding system comprising a plurality of condensers, means for charging said condensers, a transformer having primary windings and a secondary winding, a welding load circuit connected to said secondary winding, a plurality of connections to said primary windings affording a plurality of turn ratios with respect to said secondary winding, means for discharging one of said condensers into one of said connections of a sufficiently low turn ratio to tend to make said discharge oscillatory, and means which becomes active upon substantial discharge of said condenser to discharge another of said condensers into another of said connections of a sufficiently high turn ratio to make said last-named discharge non-oscillatory.

11. A welding system comprising a plurality of condensers, means for charging said condensers, a transformer having primary windings and a secondary winding, a welding load circuit connected to said secondary winding, a plurality of connections to said primary windings affording a plurality of turn ratios with respect to said secondary winding, means for discharging one of said condensers into one of said connections of a sufficiently low turn ratio to tend to make said discharge oscillatory, and means which becomes active upon substantially complete discharge of said condenser to discharge another of said condensers into another of said connections of a sufficiently high turn ratio to make said last-named discharge non-oscillatory.

12. A welding system comprising a plurality of condensers, means for charging said condensers, a transformer having primary windings and a secondary winding, a welding load circuit connected to said secondary winding, a plurality of connections to said primary windings affording a plurality of turn ratios with respect to said secondary winding, means for discharging one of said condensers into one of said connections of a sufficiently low turn ratio to tend to make said discharge oscillatory, and means operating subsequently to the initiation of and during the discharge of said condenser for discharging another of said condensers into another of said connections of a sufficiently high turn ratio to make said last-named discharge non-oscillatory.

13. A welding system comprising a plurality of condensers, means for charging said condensers, a transformer having primary windings and a secondary winding, a welding load circuit connected to said secondary winding, a plurality of connections to said primary windings affording a plurality of turn ratios with respect to said secondary winding, means for discharging one of said condensers into one of said connections of a sufficiently low turn ratio to tend to make said discharge oscillatory, and means responsive to reversal of voltage on said condenser during said discharge to discharge another of said condensers into another of said connections of a sufficiently high turn ratio to make said last-named discharge non-oscillatory.

14. A welding system comprising a plurality of condensers, means for charging said condensers, a transformer having primary windings and a secondary winding, a welding load circuit connected to said secondary winding, a plurality of connections to said primary windings affording a plurality of turn ratios with respect to said secondary winding, means for discharging one of said condensers into one of said connections of a predetermined turn ratio, and means which becomes active upon substantial discharge of said condenser to discharge another of said condensers into another of said connections of a higher turn ratio.

15. A welding system comprising a plurality of condensers, means for charging said condensers, a transformer having primary windings and a secondary winding, a welding load circuit connected to said secondary winding, a plurality of connections to said primary windings affording a plurality of turn ratios with respect to said secondary winding, means for discharging one of said condensers into one of said connections of a predetermined turn ratio, and means which becomes active upon substantially complete discharge of said condenser to discharge another of said condensers into another of said connections of a higher turn ratio.

16. A welding system comprising a plurality of electrical energy storage means, means for storing energy in said energy storage means, a welding load circuit, means for discharging one of said energy storage means into said load circuit, and means which becomes active upon substantial discharge of said energy storage means to discharge another of said energy storage means into said load circuit.

17. A welding system comprising a plurality of electrical energy storage means, means for storing energy in said energy storage means, a welding load circuit, and means for discharging said energy storage means in overlapping sequence into said welding load to accomplish a single welding operation.

18. A welding system comprising a plurality of electrical energy storage means, means for storing energy in said energy storage means, and means for utilizing the energy stored in said energy storage means in overlapping sequence to accomplish a welding operation.

HANS KLEMPERER.

REFERENCES CITED

The following references are of record in the file of this patent:

UNITED STATES PATENTS

| Number | Name | Date |
|---|---|---|
| 1,168,346 | Thomson | Jan. 18, 1916 |
| 2,179,105 | Sidney | Nov. 7, 1939 |
| 2,184,628 | Watson et al. | Dec. 26, 1939 |